No. 751,076. Patented February 2, 1904.

UNITED STATES PATENT OFFICE.

ARTHUR HOUGH, OF DOVER, NEW JERSEY.

NITRATED CARBOHYDRATE.

SPECIFICATION forming part of Letters Patent No. 751,076, dated February 2, 1904.

Application filed June 13, 1903. Serial No. 161,370. (No specimens.)

*To all whom it may concern:*

Be it known that I, ARTHUR HOUGH, a subject of the King of Great Britain, residing in Dover, Morris county, New Jersey, have invented some new and useful Improvements in Nitrated Carbohydrates, of which the following is a specification.

My invention relates to nitrated carbohydrates such as are used as explosives, and has for its object to provide a very highly-nitrated compound of great explosive power and stability.

I will now first point out briefly the results of nitrating starch as obtained prior to my invention and will then describe in detail what I consider to be the best way of manufacturing the new compound.

Nitrated compounds have been made from starch in various manners by treatment with nitric acid to which sulfuric acid is generally added. It has been found, however, that the highest nitrate obtainable was the hexa-nitrate, and even this has been obtained in a rather inefficient way, since it always appeared mixed with tetra-nitrate and tri-nitrate, which lower nitrates had to be removed. The main reason for the inefficiency of earlier processes is found, in my opinion, in the presence of too large a quantity of water at the beginning of the process and, further, in the fact that a considerable dilution of the acid takes place during the nitration, owing to the formation of water. Furthermore, it has been proved that when a carbohydrate has once been nitrated ever so little an increase of the degree of nitration can be obtained only with the greatest difficulty. For this reason whatever degree of nitration is desired must be effected at the moment the carbohydrate comes into contact with the acids for the first time.

I have secured very superior results by the process hereinafter described, in which acids of great strength are employed and in which the strength of the acid is preserved during the whole step of nitration. Preferably I employ an excess of free sulfuric anhydrid at the beginning of the nitration and make provision for adding anhydrid to preserve such excess during the entire step of nitration. I have found that by thus proceeding I obtain a body containing about sixteen and a half per cent. of nitrogen, which would indicate that this product is an octo-nitrate of starch. So far as I am aware a nitrate higher than the hexa-nitrate has never been produced from starch prior to my invention.

My process is also remarkable for its efficiency in that I obtain almost pure octo-nitrate with a very small proportion of lower nitrates admixed, which lower nitrates are readily removed by the stabilizing process.

In detail I proceed as follows: As raw material I employ corn-starch, which should not contain any alkali, as this will seriously interfere with nitration. I therefore prefer to employ starch—say corn-starch—extracted from the natural material by means of sulfurous acid or water. Starch extracted by the alkali process is also available, but should first be carefully treated to remove all traces of alkali. I first dry the starch carefully. The temperature should not be too high or the starch will burn. I find that a temperature of about 275° Fahrenheit is well adapted for the purpose, and the best way of drying is by means of steam heat. The moisture is preferably taken away by suction, and it is advisable to constantly agitate the starch while it is being dried. Commercial corn-starch contains from seven per cent. to ten per cent. of moisture, and when dried as above described the moisture may be brought down to .01 per cent. The starch is allowed to cool to the temperature of the surrounding air, or about 60° Fahrenheit, and is then ready to be nitrated.

For the purpose of nitration I employ a mixture of acids of about the following constitution: three parts, by weight, of nitric acid ($HNO_3$) of about ninety-five per cent. monohydrate and containing as low a percentage of lower oxids of nitrogen as possible and two parts, by weight, of sulfuric acid of about ninety-eight per cent., and to this mixture I add enough Nordhausen sulfuric acid containing about forty per cent. of free $SO_3$ to bring the $HNO_3$ and $H_2SO_4$ to one hundred per cent. concentration and allowing from one to two per cent. of free $SO_3$ in the solution. The mixture is well stirred, so as to render it homogeneous, and is allowed to cool to about from 50° to 70° Fahrenheit. The presence of free sulfuric anhydrid is of great value in insuring a very high yield of the new compound.

Into the acid mixture above described I introduce the dried starch. The introduction should be effected in such a manner as to avoid the floating of the starch on the surface, and for this reason I forcibly inject the finely-powdered starch, so as to throw it beneath the surface of the acid mixture. If the starch were allowed to float, the dry portion would be acted upon by the nitric-acid vapors, producing a low nitrate, which I desire to avoid. At the same time that the dry starch is introduced into the mixed acids I inject an amount of sulfuric acid having an excess of free sulfuric anhydrid preferably sufficient to keep the acids mixture at all times at least at the maximum concentration of one hundred per cent. $HNO_3$ and one hundred per cent. $H_2SO_4$. Preferably, however, the presence of free sulfuric anhydrid should be preserved in about the proportion of two per cent. Too great an excess of anhydrid will lead to the formation of sulfo compounds and interfere with the nitration. I find that at a temperature of 50° Fahrenheit the starch requires about ten minutes contact with the acid mixture to bring about a practically complete nitration to the eighth degree, so that the flow of sulfuric acid containing free sulfuric anhydrid must be regulated to absorb the water liberated from the starch during this time. Should the temperature of the mixture rise, the action is more violent, and the flow of the reinforcing acid must be accelerated. The temperature should not fall below 45°. When proceeding at 50° Fahrenheit, the product is almost wholly octo-nitrate, with a small percentage of hexa-nitrate.

It is of great importance for the securing of perfect results that the temperature should be kept as uniform as possible during nitration. Furthermore, it is preferable that the density of the acid mixture should be kept practically constant, for if at any time the strength of the acid is reduced beyond a certain point no octo-nitrate will be formed. I have also found that if the $HNO_3$ and $H_2SO_4$ should at any time fall below the full concentration of one hundred per cent. this will lead to a material increase in the proportion of the hexa-nitrate, which is formed as an impurity. For this reason it is advisable to always preserve an excess of free sulfuric anhydrid, so as to be sure that the acids will never fall below the full concentration. If the vessel within which nitration is conducted consists of iron, the excess of free sulfuric anhydrid should preferably not rise above three per cent. in order to avoid attack of the iron by the acid.

When the operation of nitrating has been completed, the nitrated carbohydrate is separated from the excess of acids in any suitable manner, as by filtration. The acid thus removed may be rendered serviceable for another operation by adding an amount of $HNO_3$ corresponding to that taken up by the starch. As there is a constant formation of $H_2SO_4$ by the combining of free sulfuric anhydrid with the water liberated from the starch, the nitric acid may be removed by distillation when the amount of sulfuric acid has become excessive.

When the nitrated product has been removed from the adhering acids, it is first washed and then stabilized—that is, freed from admixed lower nitrate. The washing is done by first treating the nitrated starch with plenty of water, agitating it well, and removing any free acid left by the addition of an alkali—for instance, sodium carbonate. The product is then brought into a filter-press and formed into cakes, which may be then removed and broken up for the stabilizing treatment, or the explosive may be stabilized in the press. The stabilizing must of course be effected by means of an agent that will have no action on the octo-nitrate of starch, but that will remove the hexa-nitrate. I have found a suitable agent for this purpose in a hot dilute solution of ammonium-hydrate. The nitro-starch powder should be treated with this solution for fifteen minutes or more.

By the process above described I produce a body having properties and a constitution different from those of any nitrostarch previously known to me. I find that this body contains about 16.5 per cent. of nitrogen, so that it would appear to be an octo-nitrate, the composition of which may be expressed either by the formula $$C_{12}H_4(HNO_3)_8O_2 \text{ or } C_{12}H_{12}(NO_2)_8O_{10}.$$

The reaction presumably takes place according to the equation $$C_{12}H_{20}O_{10} + 8HNO_3 = C_{12}H_{12}(NO_2)_8O_{10} + 8H_2O.$$

This new compound has a chemical stability hitherto unapproached by any form of nitrostarch and is of vastly greater explosive force. The product detonates by the fulminate cap more perfectly than will nitroglycerin, even when the new nitrostarch is used in the proportion of ten per cent. in a dynamite mixture the balance of which consists of sodium nitrate or similar oxidant and carbonaceous material. The explosive power of the new nitrostarch is at equal density about equal to that of nitroglycerin. The stability of the new nitrostarch is of great value in that it enables the product to be shipped and stored under varying conditions of temperature and moisture.

The product is insoluble in alcohol, ether, and dilute ammonium-hydrate, hot or cold. It is soluble in ether-alcohol and in acetic ether. When stabilized, it is an orange-colored powder silky to the touch and having no crystalline nature. Its actual specific gravity is about 1.7; but its apparent specific gravity is about 1.2. It can be dissolved in concentrated sulfuric acid only with the greatest difficulty and differs in this respect from nitrocellulose and the lower nitrates of starch. The usual Lunge's nitrometer test is therefore not available for my compound, and instead of it I employ other methods of determining the percentage of nitrogen in the compound. For instance, a good method of making a nitrogen determination of this new product is that known as the "Schultz-Tieman" test.

The product is identified from a chemical standpoint by the determination of the nitrogen percentage and also the determination of the carbon percentage by a combustion test, these two determinations to show the constitution corresponding to the formula $C_{12}H_{12}(NO_2)_8O_{10}$.

I have not made any claim in this application to the particular process above described for making my improved compound, as this process forms the subject-matter of another application for patent filed by me concurrently herewith.

What I claim as new, and desire to secure by Letters Patent, is—

As a new article of manufacture, a highly-nitrated carbohydrate, the same containing about sixteen and a half per cent. of nitrogen and having a constitution corresponding to the formula $C_{12}H_{12}(NO_2)_8O_{10}$, possessing great stability and high explosive power and forming an orange-colored powder when stabilized, silky to the touch and lacking crystalline structure, being insoluble in alcohol, ether and dilute ammonium-hydrate, and soluble in ether-alcohol and acetic ether, and soluble with difficulty in concentrated sulfuric acid.

In testimony whereof I have signed my name to this specification in the presence of two subscribing witnesses.

ARTHUR HOUGH.

Witnesses:
   JOHN LOTKA,
   EUGENE EBLE.